United States Patent
Hahn et al.

(10) Patent No.: US 6,920,205 B2
(45) Date of Patent: Jul. 19, 2005

(54) SYSTEM AND METHOD FOR INTERACTIVE COMMUNICATIONS WITH AN END-USER

(75) Inventors: Paul S. Hahn, Prosper, TX (US);
Darrick A. Deel, Allen, TX (US);
Richard A. Dunlap, Euless, TX (US);
Kelly N. Stearns, Edwardsville, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/445,165

(22) Filed: May 23, 2003

(65) Prior Publication Data

US 2004/0234048 A1 Nov. 25, 2004

(51) Int. Cl.⁷ .............................................. H04M 11/00
(52) U.S. Cl. ................. 379/88.16; 379/433.06
(58) Field of Search ......................... 379/88.01, 89.03, 379/88.04, 88.11, 88.13, 88.14, 88.16, 88.17, 88.22, 88.23, 88.25, 433.06, 429, 428.01; 370/351–357; 709/200, 201, 203

(56) References Cited

U.S. PATENT DOCUMENTS

| | | | |
|---|---|---|---|
| 5,416,831 A | * | 5/1995 | Chewning et al. ........ 379/93.25 |
| 5,615,257 A | | 3/1997 | Pezzullo et al. |
| 5,703,935 A | | 12/1997 | Raissyan et al. |
| 5,802,526 A | | 9/1998 | Fawcett et al. |
| 5,937,347 A | | 8/1999 | Gordon |
| 6,018,571 A | * | 1/2000 | Langlois et al. ........ 379/201.04 |
| 6,064,732 A | | 5/2000 | Pezzullo et al. |
| 6,157,708 A | | 12/2000 | Gordon |
| 6,182,045 B1 | * | 1/2001 | Kredo et al. ................. 704/270 |
| 6,453,164 B1 | | 9/2002 | Fuller et al. |
| 2003/0074198 A1 | * | 4/2003 | Sussman ................... 704/270.1 |
| 2003/0105639 A1 | * | 6/2003 | Naimpally et al. ......... 704/276 |
| 2004/0093211 A1 | * | 5/2004 | Reynolds et al. .......... 704/235 |

* cited by examiner

Primary Examiner—Roland G. Foster
(74) Attorney, Agent, or Firm—Baker Botts L.L.P.

(57) ABSTRACT

An apparatus for interactive communications is provided that includes an interactive element, which includes a plurality of keys. One or more of the keys are operable to trigger an audible message to be communicated to an end-user when the end-user depresses and holds a selected one of the keys. The audible message provides descriptive information associated with the selected key.

17 Claims, 2 Drawing Sheets

SYSTEM AND METHOD FOR INTERACTIVE COMMUNICATIONS WITH AN END-USER

TECHNICAL FIELD OF THE INVENTION

This invention relates in general to the field of communications and more particularly to a system and method for interactive communications with an end-user.

BACKGROUND OF THE INVENTION

Communications architectures have grown increasingly important in today's society. One aspect associated with communication architecture relates to interface elements that serve to facilitate the exchange of data or information in a communication session. As the subscriber base of end-users increases, their diversity creates new challenges for network designers and system administrators. It is important that such end-users be reasonably accommodated in their communication sessions. In cases where improper operations are executed or interfacing elements are incapable of accommodating the needs of a wide array of end-users, effective communication flows are inhibited. Additionally, end-users that are not accounted for by an interfacing element may be unable to enjoy the benefits and capabilities of a corresponding device. Notwithstanding this issue, interfacing elements should also generally provide speed and efficacy in offering a convenient and an easy-to-use device.

An interfacing element, such as a telephone for example, may provide text that informs an end-user of the status associated with a call, the identification of a caller, or any other pertinent information. This text may be adequate for one group of end-users but fails to accommodate other end-users that may be incapable of reading text or participants that would rather not be burdened with the task of reading information in order to transition to a next step in the communication process.

SUMMARY OF THE INVENTION

From the foregoing, it may be appreciated by those skilled in the art that a need has arisen for an improved communications approach that provides for enhanced interaction between an end-user and an interfacing element. In accordance with one embodiment of the present invention, a system and method for interactive communications with an end-user are provided that greatly reduce disadvantages and problems associated with conventional communication techniques.

According to one embodiment of the present invention, there is provided an apparatus for communicating with an end-user that includes an interactive element, which includes a plurality of keys. One or more of the keys are operable to trigger an audible message to be communicated to an end-user when the end-user depresses and holds a selected one of the keys. The audible message provides descriptive information associated with the selected key.

Certain embodiments of the present invention may provide a number of technical advantages. For example, according to one embodiment of the present invention, a communications approach is provided that accommodates a variety of potential end-users seeking to use an interactive element to communicate. A flexible architecture is provided that allows for information to be exchanged with an end-user with minimal effort. For example, a new user of an interactive element may depress and hold a corresponding key in order to determine how to operate a particular feature of an interfacing element. Additionally, the new end-user may evaluate a number of operations that are provided by the interfacing element. Moreover, the new user may be guided through a series of tutorials in order to assist the end-user in performing some function or operation.

Another technical advantage associated with one embodiment of the present invention relates to its improved operation. Because a given interfacing architecture may be triggered by manual contact with a selected key, power failures or energy disruptions (generally) do not inhibit a communication exchange. Thus, even in cases where a blackout has occurred, an end-user may still depress a selected key and be provided with information associated with that particular operation of the interfacing element.

Yet another technical advantage associated with one embodiment of the present invention is its versatility. The features provided by the present invention may be expanded to implementations in which an end-user does not wish to project light radiation from the interfacing element in order to determine how to initiate/operate a functionality provided by the interfacing element. For example, if an end-user is performing some action at night and does not wish to be found by an adverse party, he may key the interfacing element in order to retrieve a description associated with the depressed key (e.g. the status of a call, the identity of a caller, etc.) The recorded message may be particularly beneficial to a person who is visually impaired and incapable of deciphering the provided text. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
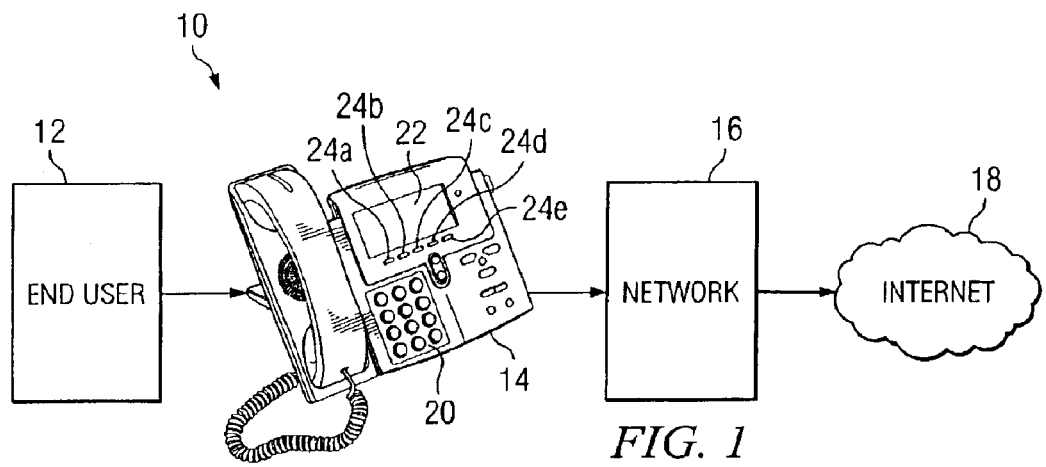
FIG. 1 is a simplified block diagram of a communication system for interactive communications with an end-user in accordance with one embodiment of the present invention.

FIG. 1 is a simplified block diagram of a communication system 10 for interactive communications with an end-user 12. Communication system 10 may include a telephone 14 to be operated by end user 12, a network 16, and an Internet 18. Telephone 14 may include a plurality of phone (or dial) buttons 20, a visual interface 22, and a series of keys 24a–e, Keys 24a–e may correlate to specific capabilities or functions being provided by telephone 14. Additionally, communication system 10 may include a number of additional intermediate or ancillary components that facilitate any of the operations of telephone 14, network 16, and Internet 18. For example, telephone 14 may be coupled to a central processing unit (CPU) or a laptop, where appropriate, that is capable of interfacing with telephone 14 in accordance with particular needs.

FIG. 1 may be generally configured or arranged to represent a communications architecture in which telephone 14 may establish a connection to Internet 18 via network 16. However, the architecture of communication system 10 as illustrated in FIG. 1 may be varied significantly, or alternatively substituted with any suitable networking components or elements that operate to provide a communicative platform for end-user 12.

In accordance with the teachings of the present invention, communication system 10 provides an architecture in which end-user 12 may press and hold a selected key 24a–e that is of interest to end-user 12. When a selected key 24a–e is held for a configured amount of time, this action will be interpreted as a request for help or a solicitation for some information. In an example scenario, an audible help prompt may be played to end-user 12 that includes a brief description of the selected key or button that was depressed. Holding down any given key for a given/designated period of time may trigger the 'help' mode (potentially interactive) that may assist the user in his endeavor. Additionally, a given key may be designated as a fast forward or rewind button for given audio messages that are being played to end-user 12. Once a determination is made that the request was for help, telephone 14 may ignore a key press such that no action is invoked other than the help request itself. In cases where the help request was for a soft key/button, the corresponding key/button may change its appearance when it is depressed and then return to its normal state.

The depression operation of the architecture provided by telephone 14 provides a configuration that is user friendly and that can accommodate a given end-user 12 that cannot see or that is not familiar with the layout of telephone 14. By invoking a help functionality using key depression, end-user 12 does not have to remove his finger from the key/button being depressed in between requesting help and invoking the selected key/button. Such an architecture may also make it easier for end-user 12 to move from one key to the next without losing their place in the process that was initiated. Additionally, progress can be maintained while searching for a feature and obtaining the requisite help. This single-key help paradigm (press and hold) effectively avoids the time-consuming (and difficult to navigate) two-key system. Moreover, the timed-key paradigm provided by communication system 10 allows greater control, flexibility, and manageability from the perspective of end user 12.

In certain applications, audio files may be stored and allow for text information to be shipped to another location. For example, information can be stored and shipped to a server that may ship back an audio file at some appropriate time. Additionally, an archive may be provided in order to record any of the actions associated with end-user 12.

In an example scenario, assume that end-user 12 seeks to initiate a call forward feature provided on telephone 14. Further presume that the call forward feature is allocated to key 24c. Key 24c represents a third soft key on telephone 14 when it is in the idle state. This may be provided as a default for telephone 14 or configured in any other appropriate manner. The mechanism provided by telephone 14 may allow end-user 12 to start with a first selected soft key. End-user 12 may press and hold the first key (key 24a) and hear an audible message that indicates: "redial" with an accompanying description being subsequently provided. End-user 12 may then move to the second key (key 24b), which may be pressed and held in order to hear an audible message that indicates: "new call." A corresponding description of this feature may follow. End-user 12 may then move to the third soft key (key 24c), which may be depressed and held in order to hear the audible message: "forward all calls." A corresponding description of this feature may follow. End-user 12 may then slightly lift his finger to return key 24c to its normal inclination. End-user 12 may also then press and release the same button again without holding it down in order to invoke the "call forward all" feature.

The example embodiment provided may also be used by a given end-user 12 that is fully capable of seeing any text information provided by display 22. End-user 12 may benefit from the convenience of hearing messages as opposed to reading lengthy text messages provided by telephone 14. Thus, end-user 12 may be working at a CPU station and blindly reach for telephone 14 in order to find a given key and trigger its operation or an audible description provided therefor.

Communication system 10 may accommodate a variety of potential end-users seeking to use any interactive element to communicate. A flexible architecture is provided that allows for information to be exchanged with an end-user with minimal effort. For example, a new user of an interactive element may depress and hold a corresponding key in order to determine how to operate a particular feature of an interfacing element. Additionally, the new end-user may evaluate a number of operations that are provided by the interfacing element. Moreover, the new user may be guided through a series of tutorials in order to assist the end-user in performing some function or operation.

A given interfacing architecture may be triggered by manual contact with a selected key and, thus, power failures or energy disruptions (generally) do not inhibit a communication exchange. Thus, even in cases where a blackout has occurred, end-user 12 may still depress a selected key and be provided with information associated with that particular operation of the interfacing element. The features provided by communication system 10 may also be expanded to implementations in which end-user 12 does not wish to project light radiation from the interfacing element in order to determine how to initiate/operate a functionality provided by the interfacing element. For example, in scenarios where end-user 12 is performing some action at night and does not wish to be found by an adverse party, he may key the interfacing element in order to retrieve a description associated with the depressed key (e.g. the status of a call, the identity of a caller, etc.).

End-user 12 is a person or entity wishing to initiate a communication in communication system 10 via telephone 14. End-user 12 may initiate the operation of telephone 14 by depressing any selected key 24a–e. Alternatively, end-user 12 may initiate the operation of telephone 14 in any other suitable, manner. End-user 12 may be visually impaired, or alternatively fully capable of reading text messages. In alternative embodiments, end-user 12 may use any other suitable interface, such as a keyboard or other terminal equipment, in order to initiate the operations of telephone 14. In addition, end-user 12 may initiate the operations of telephone 14 using a computer program, a database, or any other suitable component, device, element, or object capable of initiating a voice or a data exchange within communication system 10. Data, as used herein in this document, refers to any type of numeric, voice, video, audio-visual, or script data, or any other type of source or object code, or any other suitable information in any appropriate format that may be communicated to or from end-user 12.

Telephone 14 is an interactive element that may be used in order to facilitate the retrieval and delivery of information in communication system 10. Telephone 14 may be initiated by end-user 12 by pressing any suitable button included thereon. For example, telephone 14 may include an "i" key that represents "information" to be provided to end user 12. Alternatively, the "i" key may be replaced with a "help" symbol or a question mark ("?") such that non-English based communications may readily identify an element that may trigger the help prompt. In other scenarios, any suitable icon, text, symbol, or element may be used in order to represent a key for initiating the retrieval of requested information.

Telephone 14 may be suitably coupled to any appropriate network, such as network 16, in order to facilitate communications in a network environment (e.g. transmission control protocol/internet protocol (TCP/IP) network communications in an IP telephony configuration). Telephone 14 may be provided with a speaker capable of delivering audible messages to end-user 12. Telephone 14 may also include a suitable handset unit that allows the user to speak and hear information via telephone 14. Alternatively, telephone 14 may be substituted with any suitable interactive element that is operable to provide a data exchange for end-user 12. A number of these potential alternative interactive elements are described in greater detail below with reference to FIG. 2.

Network 16 represents a series or points of nodes of interconnected communication paths for receiving and transmitting information that propagates through communication system 10. Network 16 may be coupled to telephone 14 at Internet 18 in order to provide any suitable data exchange there between. Network 16 may be operable to facilitate a communication session initiated by end-user 12 through telephone 14. Network 16 may be any local area network (LAN), wireless local area network (WLAN), metropolitan area network (MAN), virtual private network (VPN), wide area network (WAN), or any other suitable architecture or system that facilitates communications. For example, network 16 may implement an Internet protocol (IP) communications configuration, whereby a user datagram protocol (UDP)/Internet protocol (UDP/IP) language is provided. Additionally, network 16 may accommodate hypertext transfer protocol (HTTP) requests that are initiated by the depression of a selected key 24a–e. A given key may have a time configured for it such that if the key is depressed for the requisite amount of time, an audio message may be triggered. An example embodiment, the time necessary to trigger such an action is 1.5 seconds. Alternatively, any other suitable time delay may be provided, which is user-configurable. The HTTP request may be delivered to Internet 18 or any other suitable location such that a corresponding proper description is retrieved and communicated to end-user 12. Note that configurations (e.g. time delay) may be user-configurable or administrator-configurable in accordance with particular needs. From the perspective of an administrator, it may be important to provide some consistency via a centralized configuration. Considerable flexibility is provided by communication system 10 as any such configurations may be readily accommodated.

Internet 18 is a communication platform that is operable to store information sought by end-user 12. Internet 18 may include a plurality of websites, web servers, and other elements that may be accessible via network 16. Internet 18 may provide an interface that allows for information retrieval/delivery to be provided through or via telephone 14. In an example embodiment, a web server may be provided within Internet 18 (or coupled thereto) that offers a series of audio files that may be played after end-user 12 has depressed a given key 24a–e. The audio file may be returned via network 16 to telephone 14 and correlate to whichever key (24a–e) of telephone 14 was pressed by end-user 12. In alternative embodiments, Internet 18 may be an Intranet or any other suitable communications element that is operable to facilitate a data exchange.

Figure 2:
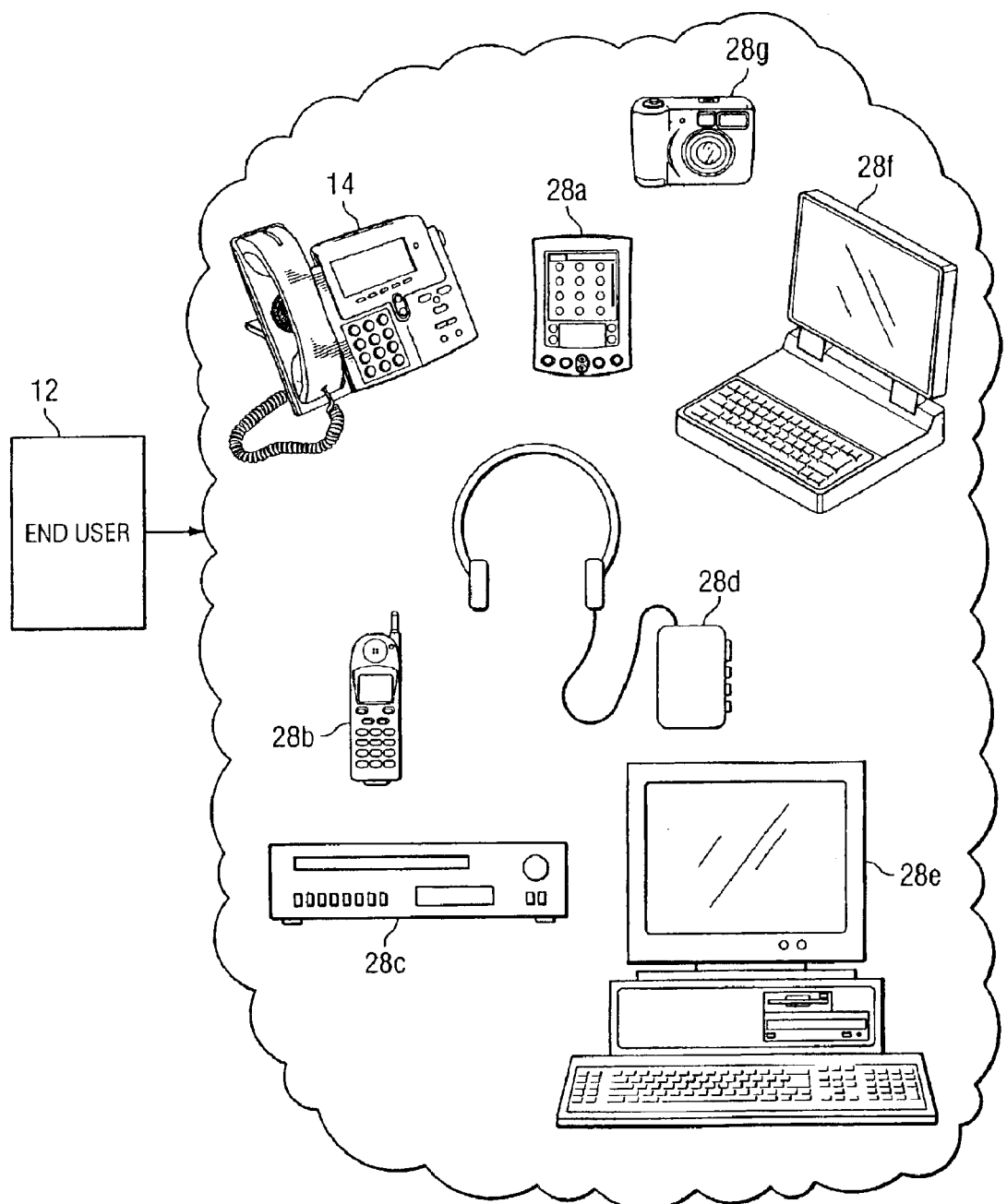
FIG. 2 is a simplified block diagram of the communication system interacting with one or more example interactive elements.

FIG. 2 is a simplified block diagram illustrating a series of example interactive elements 28a–g that may be provided in place of telephone 14. Telephone 14 represents one of a myriad of potential interactive elements that may be used to facilitate the operations of communication system 10. In addition, any of the interactive elements 28a–g may be coupled to telephone 14 and cooperate therewith. Additionally, any of interactive elements 28a–g may cooperate with each other in order to facilitate a communication session initiated by end-user 12. Interactive element 28a is a personal digital assistant (PDA); interactive element 28c is a cellular telephone; interactive element 28c is a stereo; interactive element 28d is a walkman that may be operable to play music (via CDs, a radio frequency, MP3s, using an appropriate memory chip or memory stick, etc.); interactive element 28e is a personal computer; interactive element 28f is a laptop computer; interactive element 28g is a digital camera.

Interactive elements 28a–g may behave in a manner similar to that described above with respect to telephone 14. Each of interactive elements 28a–g may include a number of buttons that, when depressed, initiate a communication session for end-user 12. The communication session or audible message may include any suitable descriptive information, such as tutorials, guidance about corresponding operations, solutions and answers to commonly asked questions, or any other germane data associated with the given key that was pressed. This allows end-user 12 to navigate through the capabilities of each of interactive elements 28a–g in order to determine the operations thereof. Additionally, a selected key may be depressed in order to identify a status associated with a given interactive device 28a–g. In other scenarios, a remote control may be used to control the device in question. The remote control may include a series of buttons that affect the operation of interactive elements 28a–g. The remote control may use any suitable technology (e.g. infrared, blue-tooth, optics, etc.) in order to trigger or launch processes or tasks to be completed by interactive elements 28a–g. Remote control arrangements may be beneficial in conference settings or in the course of providing presentations to a group of persons.

In operation of an example embodiment, an HTTP request may be made from telephone 14 (or any of interactive elements 28a–g) to a web server that may be provided within Internet 18 or coupled thereto. The HTTP request may be based on the actions of end-user 12 in pressing a given key 24a–e on telephone 14 or any other given key provided on interactive elements 28a–g. Telephone 14 (or any of interactive elements 28a–g) may be monitoring key events and looking for a situation where a given key is depressed. A uniform resource identifier (URI) may be formulated (in an example embodiment), which can be used to play an audio message file to end user 12. The audio message file may be provided within telephone 14 or alternatively provided in any other suitable location, such as on a web server for example. Note also that the press and hold feature of communication system 10 may be equally applicable to textual help being provided to end user 12, for example via display 22 or any other suitable location. Text help may be equally beneficial in certain scenarios, which are based on particular end user needs. In still other scenarios, video files may be retrieved from a web server and suitably played such that end user 12 is shown how to complete a given task. For example, the "help" key may be used in order to play a video file that illustrates how to transfer a call. End user 12 may be able to manually control the speed of the video (inclusive of rewind and fast-forward operations) such that he may complete the transfer the call successfully. In addition, such video, text, and audio files may be suitably played by an accompanying PC in cases where it is more convenient to have that information displayed there. In some cases, the PC may have the capability to effectuate such operations (or perform them better), whereas the selected interactive elements 28*a–g* may be less capable of accommodating such processes.

In an example embodiment, an HTTP uniform resource locator (URL) address for the Internet is provided as the URI. An audio file may be adequately placed on a web server such that telephone 14 (or interactive elements 28*a–g*) may retrieve the audio file and play it through a speaker. A file name can be generated that contains the locale information. This information may include which language end-user 12 is speaking and a help identification element, which may be a context-sensitive identification. Thus, a file may exist for every possible context (and language) and could be easily retrieved and broadcasted by telephone 14 to end user 12. In a simple case used for example and teaching purposes only, an HTTP URL is used to retrieve the appropriate audio file.

End-user 12 may depress and hold a 'line' key in order to be told of the state of the calls on a particular line. Caller identification and any other pertinent communications information may be provided to end-user 12 by telephone 14. Telephone 14 may accommodate both static (pre-recorded messages) and dynamic information such as the current state of telephone 14. Telephone 14 provides a comprehensive system that allows for interactive communications as well as standard default communications by depressing any given key. A number of flows, trees, menus, and hierarchies may also be navigated by end-user 12 in order to learn about the status or capabilities associated with telephone 14 (or interactive elements 28*a–g*).

In an alternative embodiment of the present invention, telephone 14 or any one of interactive elements 28*a–g* are voice-activated. This feature may accommodate a wide array of end-users, some of which may be visually impaired. Alternatively, such an operation may be applicable to persons with perfect vision but that seek a more convenient way of utilizing telephone 14 (or any of interfacing elements 28*a–g*).

Each key of telephone 14 or the keys associated with interactive elements 28*a–g* may have a unique ID associated with it (and have a corresponding language provided with it). A query may be initiated and delivered to a web server for an audio file or a text file that may be converted to an audio format. The file may be identified as corresponding to the key that was depressed. In cases where a text file is retrieved, telephone 14 can convert that information into an audio file in order to be broadcasted to end-user 12. The audio or text files may be tutorials, mini-lectures, pre-recorded messages, or any other suitable data or descriptive information that may be sought or communicated to end-user 12. Additionally, voice interaction may be accommodated via telephone 14 such that end-user 12 may be guided based on his own telephone input. This provides an interactive approach to guiding end-user 12 step by step through a given operation or process. Success may be measured or communicated to end-user 12 by an audio message that explains his actions are 'correct' in an example embodiment.

It is important to recognize that the enhanced operations of telephone 14 (or interactive elements 28*a–g*) do not inhibit an existing communications architecture. Thus, the enhancements made to telephone 14 (or interactive elements 28*a–g*) do not slow communication speeds associated with a conventional telephone application.

One configuration for transferring audio files is associated with using an HTTP protocol; however, another protocol for transferring audio files to telephone 14 may be associated with directing queries to a given computer, which may interact or pass the HTTP request to network 16 for additional processing. Thus, a given computer may interact with any of interactive elements 28*a–g* or telephone 14. In another example of file transfer, a trivial file transfer protocol (TFTP) configuration may be provided that allows for the retrieval of an audio file for end-user 12.

In an alternative embodiment, any of keys 24*a–e* may be provided with varying textures in order to signal to end-user 12 that a given key has been designated with a certain functionality. For example, undulations may be provided to a given key in order to indicate that this is a line key, which is operable to provide a status associated with the given communications line. In other embodiments, the shape of the keys may be changed in order to provide an identity for a given functionality. In other embodiments, any other suitable distinguishing characteristic or feature may be provided in order to signal an identifying characteristic to end-user 12.

Additionally, any of the programs or software associated with a personal computer may interface with telephone 14 or interactive elements 28*a–g* in order to play data segments associated with (or included within) the programs or software. This may allow, for example, end-user 12 to be reminded of calendar appointments via an audio file being played through telephone 14. In other applications, interoffice communications may be passed through telephone 14 via a personal computer. In still other applications, emergency messages (potentially unsolicited) may be played to end-user 12 via telephone 14.

Figure 3:
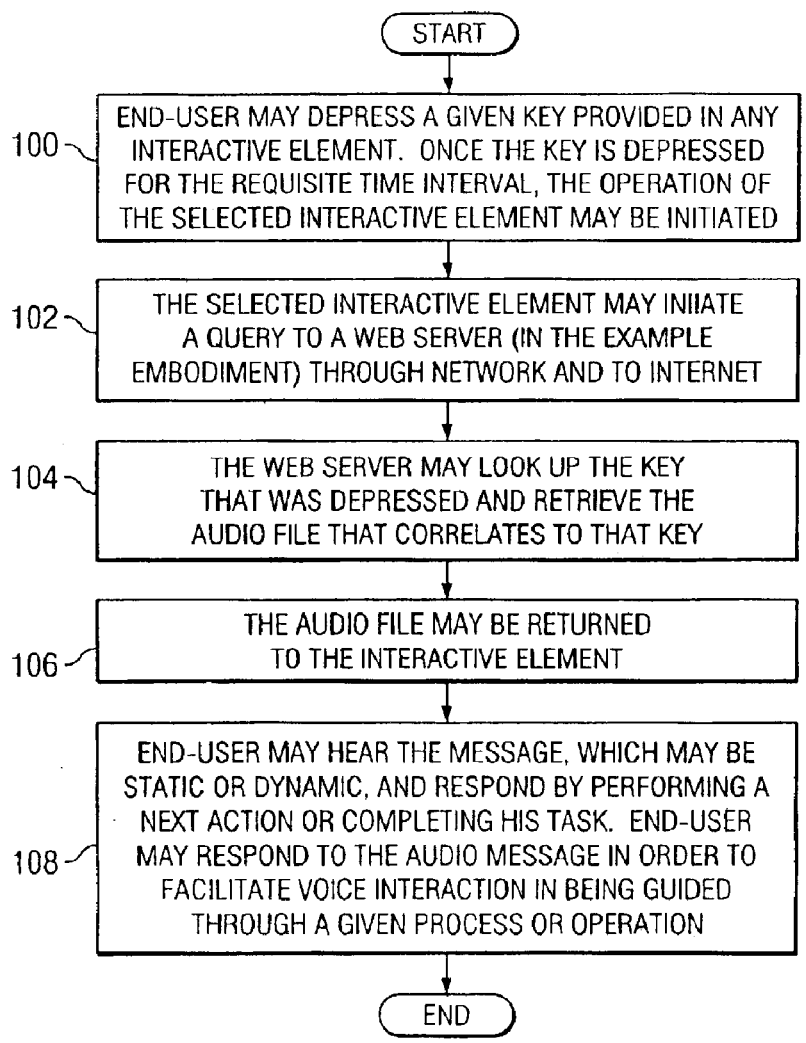
FIG. 3 is a flow chart illustrating a series of example steps associated with a method for interactive communications with an end-user in accordance with one embodiment of the present invention.

FIG. 3 is a simplified flow chart illustrating a series of example steps associated with a method for providing interactive communications for end-user 12. The method may begin at step 100, where end-user 12 may depress a given key provided in telephone 14 or any interactive element 28*a–g*. Once the key is depressed for the requisite time interval, the operation of the selected interactive element 28*a–g* is initiated. At step 102, the selected interactive element may initiate a query to a web server (in the example embodiment) through network 16 and to Internet 18. Alternatively, the query may be appropriately processed at the actual interactive element or at any other suitable location in accordance with particular needs.

At step 104, the web server may look up the key that was depressed and retrieve the audio file that correlates to that key. At step 106, the audio file may be returned to the interactive element. Alternatively, a text file may be retrieved from the web server and provided to the interactive element (or defined proxy in cases where the information is being redirected to another suitable location). In such a case, the interactive element may convert the text file to an audio format to be played for end-user 12. In other scenarios, the file server may retrieve a text file and return the text file to any other suitable location that is operable to convert the information into an audio format to be played for end-user 12. At step 108, end-user 12 may hear the message, which may be static or dynamic, and respond by performing a next action or completing his task. In certain embodiments, end-user 12 may respond to the audio message in order to facilitate voice interaction in being guided through a given process or operation. Other scenarios may simply involve end-user 12 listening to the prompted message.

Some of the steps illustrated in FIG. 3 may be changed or deleted where appropriate and additional steps may also be added to the flow chart. These changes may be based on specific communication architectures or particular interfacing arrangements and configurations of associated elements and do not depart from the scope or the teachings of the present invention.

Although the present invention has been described in detail with reference to particular communications, communication system 10 may be used in any protocol seeking to retrieve an audio file to be played at a given interactive element. Any suitable communications that involve the retrieval of an audio or a text file to be communicated to end-user 12 (without requiring end-user 12 to read text) may benefit from the teachings of the present invention.

In addition, communication system 10 may be extended to any scenario in which end-user 12 can depress a given button in order to trigger the initiation of guidance to be provided in a communication session. Thus, any consumer electronic device may be used and considered as an interactive element capable of providing audio messages to end-user 12. Such interactive elements are inclusive of telephone 14 and the elements illustrated in FIG. 2, as well as any other suitable device, component, object, element, that is capable of delivering information to be heard by end-user 12.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for interactive communications, comprising:
   an interactive element that includes a plurality of keys, wherein one or more of the keys are operable to trigger an audible message to be communicated to an end-user when the end-user depresses and holds a selected one of the keys, the audible message providing descriptive information associated with the selected key, and wherein the interactive element is a selected one of a group of interactive elements, the group consisting of:
   (1) a telephone;
   (2) a personal digital assistant (PDA);
   (3) a cellular telephone;
   (4) a stereo;
   (5) a personal computer;
   (6) a Walkman;
   (7) a laptop; and
   (8) a digital camera.

2. The apparatus of claim 1, wherein the audible message is correlated to an audio file that may be retrieved from a web server, the web server operable to store a plurality of audio files associated with one or more of the keys.

3. The apparatus of claim 1, wherein a selected one of the keys is shaped such that it may be distinguished from one or more of the other keys.

4. The apparatus of claim 1, wherein a selected one of the keys includes undulations on the surface thereof that distinguishes the selected key from one or more of the other keys.

5. The apparatus of claim 1, wherein the interactive element is coupled to a central processing unit (CPU) and is operable to interface with the CPU, the interactive element being operable to broadcast an ancillary audible message that reflects a selected one of a plurality of data segments included within one or more programs included in the CPU.

6. The apparatus of claim 1, wherein the interactive element includes a visual display operable to display text information associated with the audible message.

7. The apparatus of claim 1, wherein the interactive element provides a selected one of a group of data elements consisting of:
   (1) a tutorial;
   (2) a menu;
   (3) unsolicited information associated with an emergency condition; and
   (4) calendar information associated with the end-user.

8. The apparatus of claim 1, wherein the time interval for holding the key after it is depressed in order to trigger the audible message is user configurable.

9. The apparatus of claim 1, wherein the interactive element is voice activated such that the end-user can vocally trigger the audible message.

10. The apparatus of claim 1, wherein the interactive element is operable to store a plurality of audible messages that correspond to a selected one of the plurality of keys.

11. The apparatus of claim 1, wherein the interactive element is operable to convert text information into the audible message to be played to the end-user.

12. The apparatus of claim 1, wherein the interactive element includes a speaker operable to broadcast the audible message to the end user.

13. An apparatus for interactive communications, comprising:
   an interactive element that includes a plurality of keys, wherein one or more of the keys are operable to trigger an audible message to be communicated to an end-user when the end-user depresses and holds a selected one of the keys, the audible message providing descriptive information associated with the selected key, and wherein the interactive element is coupled to a central processing unit (CPU) and is operable to interface with the CPU, the interactive element being operable to broadcast an ancillary audible message that reflects a selected one of a plurality of data segments included within one or more programs included in the CPU, the interactive element including a visual display operable to display text information associated with the audible message, and wherein the interactive element is a selected one of a group of interactive elements, the group consisting of:
   (1) a telephone;
   (2) a personal digital assistant (PDA);
   (3) a cellular telephone;
   (4) a stereo;
   (5) a personal computer;
   (6) a Walkman;
   (7) a laptop; and
   (8) a digital camera.

14. The apparatus of claim 13, wherein the interactive element is voice activated such that the end-user can vocally trigger the audible message.

15. The apparatus of claim 13, wherein the interactive element is operable to store a plurality of audible messages that correspond to a selected one of the plurality of keys.

16. The apparatus of claim 13, wherein the interactive element is operable to convert text information into the audible message to be played to the end-user.

17. The apparatus of claim 13, wherein the interactive element is operated by a remote control operable to trigger one or more tasks to be completed by the interactive element.

* * * * *